US012747615B2

(12) United States Patent
Takada

(10) Patent No.: US 12,747,615 B2
(45) Date of Patent: Sep. 29, 2026

(54) VEHICLE POWER SUPPLY DEVICE AND DOOR LATCH DEVICE

(71) Applicant: MINEBEA MITSUMI Inc., Nagano (JP)

(72) Inventor: Yusuke Takada, Hiroshima (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 18/691,161

(22) PCT Filed: Dec. 20, 2022

(86) PCT No.: PCT/JP2022/046786

§ 371 (c)(1),
(2) Date: Mar. 12, 2024

(87) PCT Pub. No.: WO2023/120502

PCT Pub. Date: Jun. 29, 2023

(65) Prior Publication Data

US 2024/0426148 A1 Dec. 26, 2024

(30) Foreign Application Priority Data

Dec. 23, 2021 (JP) ................................ 2021-209723

(51) Int. Cl.
*E05B 81/82* (2014.01)
*B60R 16/033* (2006.01)
(Continued)

(52) U.S. Cl.
CPC ............ *E05B 81/82* (2013.01); *B60R 16/033* (2013.01); *H02J 1/108* (2013.01); *H02J 9/061* (2013.01)

(58) Field of Classification Search
CPC ........ E05B 81/82; B60R 16/033; H02J 1/108; H02J 9/061
See application file for complete search history.

(56) References Cited

U.S. PATENT DOCUMENTS 11,337,283 B2 * 5/2022 Zhao ...................... H05B 45/34
2008/0236219 A1 * 10/2008 Sakate .................. E05B 17/007
70/237

(Continued)

FOREIGN PATENT DOCUMENTS

JP 2009-144441 A 7/2009
JP 2015-128341 A 7/2015

(Continued)

OTHER PUBLICATIONS

International Search Report for corresponding International Application No. PCT/JP2022/046786 mailed Feb. 14, 2023.

(Continued)

*Primary Examiner* — Menatoallah Youssef
*Assistant Examiner* — Esayas G Yeshaw
(74) *Attorney, Agent, or Firm* — Chrisman Gallo Tochtrop LLC

(57) ABSTRACT

A vehicle power supply device includes a backup power supply to which power is supplied from a battery mounted in the vehicle, a boost unit that boosts a voltage of the backup power supply to a predetermined boost voltage, a motor drive unit that is connected to the battery and the boost unit and is capable of driving the electric motor by being supplied with power from one of the battery and the boost unit, a first switching unit that conducts or interrupts power supply between the battery and the motor drive unit, a control unit that controls the first switching unit, and a second switching unit that is provided between the boost unit and the first switching unit and turns off the first switching unit when a voltage output from the boost unit becomes equal to or higher than the predetermined boost voltage.

5 Claims, 2 Drawing Sheets

(51) Int. Cl.
*H02J 1/108* (2026.01)
*H02J 9/06* (2006.01)

(56) References Cited

U.S. PATENT DOCUMENTS

| | | | | |
|---|---|---|---|---|
| 2016/0090762 A1* | 3/2016 | Strole | ..................... | E05B 81/20 292/201 |
| 2016/0329737 A1* | 11/2016 | Yamamoto | ............ | H10F 77/955 |
| 2018/0006550 A1* | 1/2018 | Kao | ....................... | H02H 9/002 |
| 2019/0103758 A1 | 4/2019 | Fukae | | |
| 2024/0006989 A1* | 1/2024 | Goto | ..................... | H02M 3/285 |
| 2024/0072655 A1* | 2/2024 | Wong | ...................... | H02M 1/36 |

FOREIGN PATENT DOCUMENTS

| | | |
|---|---|---|
| JP | 2015-231269 A | 12/2015 |
| JP | 2017-216799 A | 12/2017 |
| JP | 2018-042334 A | 3/2018 |
| JP | 2019-080396 A | 5/2019 |

OTHER PUBLICATIONS

Written Opinion for corresponding International Application No. PCT/JP2022/046786 dated Feb. 14, 2023.

* cited by examiner

M
MOTOR DRIVE UNIT
DOOR LOCK SWITCH
CONTROL UNIT
BOOST IC CONTROL UNIT
MOTOR DRIVE CONTROL UNIT
SECOND RELAY CONTROL UNIT
DOOR LOCK SWITCH OPERATION DETAMINATION UNIT
FIRST RELAY CONTROL UNIT
BOOST IC
REGULATOR

VEHICLE POWER SUPPLY DEVICE AND DOOR LATCH DEVICE

CROSS-REFERENCE TO RELATED APPLICATIONS

This is a national phase application in the United States of International Patent Application No. PCT/JP2022/046786 with an international filing date of Dec. 20, 2022, which claims priority of Japanese Patent Application No. 2021-209723 filed on Dec. 23, 2021, the contents of which are incorporated herein by reference.

TECHNICAL FIELD

The present invention relates to a vehicle power supply device and a door latch device.

BACKGROUND ART

JP-A-2009-144441 discloses a vehicle door lock system that actuates a door lock motor by power supplied from a battery provided on a vehicle-body-side to perform a locking operation and an unlocking operation of a vehicle door. In this system, a backup power supply charged by power from a battery is provided in the vehicle door, and the door lock motor is configured to operate by power supplied from the backup power supply in case where power supply from the battery to the door lock motor is cut off.

PRIOR ART DOCUMENT

Summary of the Invention

In a power supply device capable of supplying power from a backup power supply to a motor as in the vehicle door lock system of JP-A-2009-144441, the motor always operates by power from the battery in case where the power supply from the battery to the motor is not cut off, that is, in a normal state. However, the voltage of the battery may greatly fluctuate from its rated voltage, and the motor may not be able to be stably operated.

An object of the present invention is to provide a vehicle power supply device capable of stably operating a motor even in case where a voltage of a battery greatly fluctuates.

One aspect of the present invention provides a vehicle power supply device including:

- a backup power supply to which power is supplied from a battery mounted in a vehicle;
- a boost unit that boosts a voltage of the backup power supply to a predetermined boost voltage;
- a motor drive unit that is connected to the battery and the boost unit and is capable of driving an electric motor by being supplied with power from one of the battery and the boost unit;
- a first switching unit that conducts or cuts off power supply between the battery and the motor drive unit;
- a control unit that controls the first switching unit; and
- a second switching unit that is provided between the boost unit and the first switching unit and turns off the first switching unit when a voltage output from the boost unit becomes equal to or higher than the predetermined boost voltage.

According to the present invention, when the voltage output from the boost unit becomes equal to or higher than the predetermined boost voltage, the power supply from the battery to the motor drive unit is cut off, and the power is supplied from the boost unit. Therefore, the motor can be stably operated by supplying power not from a battery whose voltage is likely to fluctuate but from a boost unit whose voltage is stable.

According to the present invention, a motor can be stably operated even in case where a voltage of a battery greatly fluctuates.

DETAILED DESCRIPTION

Hereinafter, a vehicle power supply device according to an embodiment of the present invention will be described with reference to the accompanying drawings. Note that the following description is merely illustrative in nature, and is not intended to limit the present invention, its application, or its use.

First Embodiment

Figure 1:
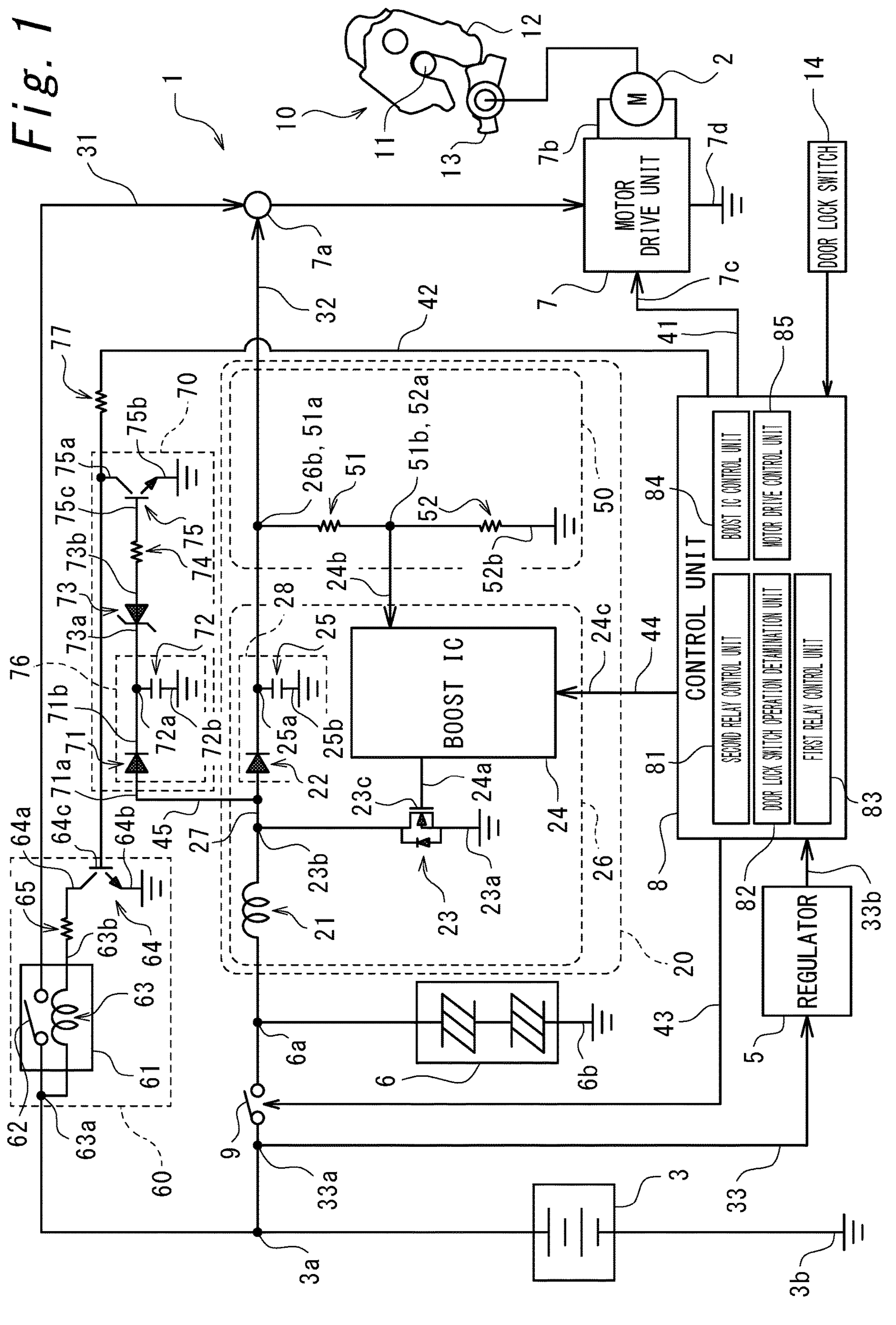
FIG. 1 is a circuit diagram of a vehicle power supply device according to a first embodiment of the present invention.

FIG. 1 is a circuit diagram of a vehicle power supply device 1 according to a first embodiment of the present invention. The vehicle power supply device 1 is a device for supplying power to an electric motor 2 that performs a locking operation and an unlocking operation of a door latch device 10 provided in a vehicle door (not illustrated).

The door latch device 10 includes a fork 12 that is rotatable between a latch position where the fork 12 is in engagement with a striker 11 on the vehicle-body-side and an open position where the engagement is released, and a claw 13 rotatable between a locking position at which the fork 12 is held at the latch position and a locking release position where the locking is released. Further, the vehicle door is provided with a door lock switch 14 for a user to operate the locking operation and the unlocking operation of the door latch device 10. By operating the door lock switch 14, the claw 13 is rotated via the electric motor 2, and thereby the vehicle door is locked or unlocked.

The vehicle power supply device 1 includes a battery 3 provided in a vehicle body. Further, the vehicle power supply device 1 includes, in the vehicle door, a motor drive unit 7 capable of driving the electric motor 2 and a control unit 8 that controls operation of the vehicle power supply device 1. The battery 3 has a rated voltage of DC 12 V.

The battery 3 stores power necessary for operation of the vehicle, supplies the power to vehicle-mounted devices such as a prime mover and an electrical component as necessary, and is charged by, for example, a generator (not illustrated) rotationally driven by the prime mover (not illustrated) or a regenerative brake (not illustrated) when a storage amount decreases. The battery 3 has an output terminal **3*a* to which the stored power is output, and a ground terminal 3*b*** connected to the ground.

The motor drive unit 7 includes an input terminal **7*a* to which power is supplied, an output terminal 7*b* that supplies power to the electric motor 2, a control terminal 7*c* to which a control signal from the control unit 8 is input, and a ground terminal 7*d* grounded. The control terminal 7*c* is connected to the control unit 8 via a first control signal line 41. The motor drive unit 7 supplies power to the electric motor 2 so as to rotate the electric motor 2 forward or backward based on the control signal input to the control terminal 7***c*.

The output terminal 3*a* of the battery 3 and the input terminal 7*a* of the motor drive unit 7 are connected by two lines including a first power supply line 31 and a second power supply line 32 connected in parallel to each other. A first switching unit 60 is provided on the first power supply line 31. The first switching unit 60 includes a first relay 61 (first switching element) and a first transistor 64.

The first relay 61 includes a contact 62 and a coil 63. The contact 62 is provided on the first power supply line 31. The coil 63 has one end 63*a* connected between the battery 3 and the contact 62 on the first power supply line 31, and another end 63*b* connected to the first transistor 64 (second switching element) via a resistor 65.

The first transistor 64 includes a collector 64*a*, an emitter 64*b*, and a base 64*c*. The collector 64*a* is connected to the other end 63*b* of the coil 63. The emitter 64*b* is grounded. The base 64*c* is connected to the control unit 8 via a second control signal line 42.

The first relay 61 is configured to be normally open, and when a control signal is input from the control unit 8, a current flows from the battery 3 to the coil 63 by conduction between the collector 64*a* and the emitter 64*b* of the first transistor 64, and the contact 62 is turned on (closed) using a magnetic force generated in the coil 63. As a result, power is supplied from the battery 3 to the motor drive unit 7 via the first relay 61.

On the other hand, a backup power supply 6 and a boost unit 20 are provided on a second power supply line 32, and a predetermined boost voltage Vb to which power output from backup power supply 6 is boosted by the boost unit 20 is supplied to the motor drive unit 7. That is, one of the output voltage of the battery 3 supplied via the first power supply line 31 and the predetermined boost voltage Vb supplied from the boost unit 20 via the second power supply line 32 is supplied to the motor drive unit 7.

On the second power supply line 32, a second relay 9 is provided between the battery 3 and the backup power supply 6. The second relay 9 is connected to the control unit 8 via a third control signal line 43. The second relay 9 is configured to be normally open and is conductive when a control signal is input from the control unit 8. When the second relay 9 is conductive, the backup power supply 6 is conductive with the battery 3 and stores power supplied from the battery 3.

The boost unit 20 includes a boost circuit 26 that boosts the voltage of the backup power supply 6 to the predetermined boost voltage Vb and a voltage-divide circuit 50 that divides the predetermined boost voltage Vb.

The backup power supply 6 is interposed between the second relay 9 and the boost circuit 26 on the second power supply line 32. The backup power supply 6 has one end 6*a* connected to the second power supply line 32 and another end 6*b* grounded. The backup power supply 6 is a capacitor in the present embodiment, and is caused to store electric power at a voltage of about 3 V to 5 V DC.

The boost circuit 26 includes a coil 21 and a diode 22 provided on the second power supply line 32 in series in order from the battery 3.

A field effect transistor 23 is interposed between the coil 21 and the diode 22 on the second power supply line 32. The field effect transistor 23 has a source 23*a*, a drain 23*b*, and a gate 23*c*. The source 23*a* is grounded. The drain 23*b* is connected to the second power supply line 32. An output terminal 24*a* of a boost IC 24 is connected to the gate 23*c*.

The boost IC 24 includes a feedback terminal 24*b* and a control terminal 24*c* in addition to the output terminal 24*a*. A voltage to which the predetermined boost voltage Vb is divided by the voltage-divide circuit 50 is input to the feedback terminal 24*b* as a feedback voltage Vf. The control terminal 24*c* is connected to the control unit 8 via a fourth control signal line 44. The boost IC 24 outputs a control signal from the output terminal 24*a* to the gate 23*c* based on the control signal from the control unit 8.

Specifically, the field effect transistor 23 is turned on in response to a control signal input to the gate 23*c*, and conducts between the source 23*a* and the drain 23*b*, thereby supplying a current from the backup power supply 6 to the coil 21 to accumulate electric energy in the coil 21 as magnetic energy. Next, the boost IC 24 releases conduction between the source 23*a* and the drain 23*b* by turning off the field effect transistor 23, and releases the magnetic energy accumulated in the coil 21 as electric energy.

The boost IC 24 outputs the control signal to the field effect transistor 23 so that the field effect transistor 23 is repeatedly turned on and off as described above, whereby accumulation of energy to the coil 21 and release of energy from the coil 21 are repeated. The boost IC 24 boosts the voltage from the backup power supply 6 until the feedback voltage Vf reaches a predetermined target voltage V0. As a result, the voltage output from the backup power supply 6 is output as the predetermined boost voltage Vb.

On the second power supply line 32, a capacitor 25 is interposed on the side adjacent to the motor drive unit 7 with respect to the diode 22. The capacitor 25 has one end 25*a* connected to the second power supply line 32 and another end 25*b* grounded. The diode 22 and the capacitor 25 are located on the side adjacent to the motor drive unit 7 with respect to the field effect transistor 23, and thus fluctuation of the voltage of the predetermined boost voltage Vb is suppressed by the diode 22 and the capacitor 25. Therefore, the diode 22 and the capacitor 25 configure a first voltage stabilizing unit 28.

As described above, the coil 21, the diode 22, the field effect transistor 23, the boost IC 24, and the capacitor 25 configure the boost circuit 26 that boosts the voltage output from the backup power supply 6 to the predetermined boost voltage Vb. Further, in the following description, a line through which the electricity boosted by the boost IC 24 flows, that is, a portion of the second power supply line 32 located from the drain 23*b* of the field effect transistor 23 toward the motor drive unit 7 is referred to as an output line 27.

The voltage-divide circuit 50 is interposed on the second power supply line 32 on the side adjacent to the motor drive unit 7 with respect to the capacitor 25. The voltage-divide circuit 50 includes a first resistor 51 and a second resistor 52. The first resistor 51 has one end 51*a* connected to an output terminal 26*b* of the boost circuit 26, and another end 51*b* connected to the feedback terminal 24*b* of the boost IC 24. The second resistor 52 has one end 52*a* connected to the other end 51*b* of the first resistor 51, and another end 52*b* grounded.

Since the first resistor 51 and the second resistor 52 are connected in series in the voltage-divide circuit 50, the voltage-divide ratio in the first resistor 51 is represented by a ratio of a resistance value R1 of the first resistor 51 to a total resistance R0 of the resistance value R1 of the first resistor 51 and a resistance value R2 of the second resistor 52. Therefore, the predetermined boost voltage Vb output from the boost circuit 26 drops according to the voltage-divide ratio in the first resistor 51, and is input to the feedback terminal 24*b* of the boost IC 24 as the feedback voltage Vf.

As described above, the boost IC 24 adjusts the predetermined boost voltage Vb so that the feedback voltage Vf input from the feedback terminal 24*b* becomes a predetermined value. The first resistor 51 and the second resistor 52 are set so that the predetermined boost voltage Vb is equal to or higher than the minimum voltage at which the electric motor 2 operates and smaller than the rated voltage of the battery 3. An operating voltage of the electric motor 2 is equal to or higher than 9 V DC and equal to or lower than 16 V DC.

In the present embodiment, the resistance value R1 of the first resistor 51 is set to 142 kΩ, the resistance value R2 of the second resistor 52 is set to 22 kW, and the target voltage V0 of the feedback voltage Vf is set to 1.274 V DC so that the predetermined boost voltage Vb becomes 9.5 V DC.

Specifically, the voltage-divide ratio between the first resistor 51 and the second resistor 52 is 142:22, and the predetermined boost voltage Vb when the feedback voltage Vf becomes the target voltage V0 is calculated to be about 9.5 V from the following expression (1).

[Math. 1]

$$Vb = V0 \div \frac{R2}{(R1+R2)} = 1.274\ \text{V} \div \frac{22\ k\Omega}{(142\ k\Omega + 22\ k\Omega)} = 9.49\ \text{V} \approx 9.5\ \text{V} \quad (1)$$

Therefore, the boost IC 24 controls the field effect transistor 23 so that the feedback voltage Vf becomes the target voltage V0, whereby the voltage output from the backup power supply 6 can be boosted to the predetermined boost voltage Vb.

Here, the vehicle power supply device 1 has a fifth control signal line 45 which connects the second power supply line 32 and the second control signal line 42, and which controls on/off by the first switching unit 60. A second switching unit 70 is provided on the fifth control signal line 45. The second switching unit 70 includes a diode 71, a Zener diode 73, a resistor 74, and a second transistor 75 (third switching element) in series in order from the second power supply line 32. A capacitor 72 is interposed between the diode 71 and the Zener diode 73.

The capacitor 72 has one end 72*a* connected to the fifth control signal line 45 and another end 72*b* grounded. The diode 71 has an anode 71*a* connected between the field effect transistor 23 and the diode 22 on the second power supply line 32, and a cathode 71*b* connected to the one end 72*a* of the capacitor 72. In the fifth control signal line 45, the diode 71 causes electricity to flow from the second power supply line 32 toward the second control signal line 42, but does not cause electricity to flow in the opposite direction.

The voltage fluctuation of the electricity flowing through the fifth control signal line 45 is suppressed by the diode 71 and the capacitor 72. Therefore, the diode 71 and the capacitor 72 configure a second voltage stabilizing unit 76.

The Zener diode 73 has a cathode 73*a* connected to the cathode 71*b* of the diode 71, and an anode 73*b* connected to the side adjacent to the second control signal line 42. That is, in the Zener diode 73, the cathode 73*a* is connected to the output line 27 via the diode 71. In the fifth control signal line 45, the Zener diode 73 causes electricity to flow from the second control signal line 42 toward the second power supply line 32 but does not cause electricity to flow in the opposite direction, but when an applied voltage is equal to or higher than a predetermined voltage, the Zener diode also causes electricity to flow in the opposite direction (that is, from the side adjacent to the second power supply line 32 to the side adjacent to the second control signal line 42). In the present embodiment, the predetermined voltage related to the Zener diode 73 is set to a predetermined boost voltage Vb. Note that the predetermined voltage related to the Zener diode 73 may be set to be lower than the predetermined boost voltage Vb, but in that case, the predetermined voltage only needs to be set equal to or higher than the minimum operating voltage of the electric motor 2, that is, higher than 9 V.

The second transistor 75 includes a collector 75*a*, an emitter 75*b*, and a base 75*c*. The collector 75*a* is connected to the second control signal line 42. The emitter 75*b* is grounded. The base 75*c* is connected to the anode 73*b* of the Zener diode 73 via the resistor 74. In the second control signal line 42, a resistor 77 is provided between the control unit 8 and the collector 75*a* of the second transistor 75.

With the fifth control signal line 45, when the voltage in the output line 27 is less than the predetermined boost voltage Vb, the flow of electricity from the second power supply line 32 toward the second control signal line 42 is cut off by the Zener diode 73. On the other hand, when the voltage on the output line 27 becomes equal to or higher than the predetermined boost voltage Vb, the Zener diode 73 causes electricity to flow from the second power supply line 32 to the second control signal line 42, and the current is input to the base 75*c* of the second transistor 75.

As a result, the second transistor 75 is turned on, the collector 75*a* and the emitter 75*b* are conducted, and the second control signal line 42 is grounded via the second transistor 75. Therefore, the control signal from the control unit 8 to first transistor 64 via second control signal line 42 reaches the ground via the second transistor 75, and thus the first transistor 64 is not turned on but turned off.

A third power supply line 33 to which the voltage of the battery 3 is supplied is connected to the control unit 8. The third power supply line 33 supplies operating power from the battery 3 to the control unit 8, and has one end 33*a* connected to the side adjacent to the battery 3 with respect to the second relay 9 on the second power supply line 32, and another end 33*b* connected to the control unit 8. A regulator 5 is interposed in the third power supply line 33, and the power from the battery 3 is stepped down to 5 V and supplied to the control unit 8.

Furthermore, a control signal output from the door lock switch 14 is input to the control unit 8. The control unit 8 determines whether or not the door lock switch 14 has been operated based on the control signal from the door lock switch 14.

As described above, the first to fourth control signal lines 41 to 44 are connected to the control unit 8. The control unit 8 outputs a control signal to the motor drive unit 7, the first relay 61, the second relay 9, and the boost IC 24 via the first to fourth control signal lines 41 to 44.

The control unit 8 includes a known computer including a memory, a storage device, and an arithmetic processing unit (CPU), and software implemented in the computer. The control unit 8 includes a second relay control unit 81, a door lock switch operation determination unit 82, a first relay control unit 83, a boost IC control unit 84, and a motor drive control unit 85.

The second relay control unit 81 appropriately charges the backup power supply 6 from the battery 3 by conducting (turning on) the second relay 9. The door lock switch operation determination unit 82 determines whether or not the door lock switch 14 has been operated based on a signal from the door lock switch 14. The first relay control unit 83 inputs a control signal to the first relay 61 to electrically conduct (turn on) the first relay 61. The boost IC control unit 84 controls the boost IC 24 based on the operation of the door lock switch 14 to boost the voltage of the power output from the backup power supply 6 to the predetermined boost voltage Vb. The motor drive control unit 85 controls the motor drive unit 7 to rotate the electric motor 2 forward or backward.

Next, operation of the vehicle power supply device 1 will be described.

First, the control unit 8 causes the second relay control unit 81 to conduct the second relay 9 at a predetermined timing to supply power from the battery 3 to the backup power supply 6. Accordingly, the backup power supply 6 is appropriately charged in preparation for a locking operation or an unlocking operation of the door latch device 10.

When the control unit 8 determines by means of the door lock switch operation determination unit 82, that the door lock switch 14 has been operated, the control unit 8 causes the boost IC control unit 84 to operate the boost IC 24 to boost the voltage output from the backup power supply 6 to the predetermined boost voltage Vb so that the feedback voltage Vf becomes the target voltage V0, and causes the first relay control unit 83 to output a control signal toward the first relay 61 via the second control signal line 42.

Here, when the backup power supply 6 is sufficiently charged, the power from the backup power supply 6 is boosted to the predetermined boost voltage Vb. As a result, the second transistor 75 is turned on in the second switching unit 70, and thus the second control signal line 42 is connected to the ground via the second transistor 75, the control signal from the control unit 8 is not input to the first switching unit 60, and the first switching unit 60 is not turned on but turned off.

Therefore, in this case, the battery 3 and the motor drive unit 7 are cut off by the first relay 61 of the first power supply line 31, and power is supplied to the motor drive unit 7 at the predetermined boost voltage Vb via the second power supply line 32.

On the other hand, when the charge amount of the backup power supply 6 is insufficient, the power from the backup power supply 6 is not boosted to the predetermined boost voltage Vb. As a result, the second transistor 75 is not turned on in the second switching unit 70, the second control signal line 42 is not connected to the ground via the second transistor 75, the control signal from the control unit 8 is input to the first switching unit 60, and the first switching unit 60 is turned on.

Therefore, in this case, the battery 3 and the motor drive unit 7 are in a conductive state via the first relay 61 of the first power supply line 31, and power is supplied from the battery 3 to the motor drive unit 7 via the first power supply line 31.

With the vehicle power supply device 1 according to the above-described embodiment, the following effects are exhibited.

(1) The vehicle power supply device 1 includes a backup power supply 6 to which power is supplied from a battery 3 mounted in the vehicle, a boost unit 20 that boosts a voltage of the backup power supply 6 to a predetermined boost voltage Vb, a motor drive unit 7 that is connected to the battery 3 and the boost unit 20 and is capable of driving the electric motor 2 by being supplied with power from one of the battery 3 and the boost unit 20, a first switching unit 60 that conducts or interrupts power supply between the battery 3 and the motor drive unit 7, a control unit 8 that controls the first switching unit 60, and a second switching unit 70 that is provided between the boost unit 20 and the first switching unit 60 and turns off the first switching unit 60 when a voltage output from the boost unit 20 becomes equal to or higher than the predetermined boost voltage Vb.

As a result, when the voltage output from the boost unit 20 becomes equal to or higher than the predetermined boost voltage Vb, the power supply from the battery 3 to the motor drive unit 7 is cut off, and the power is supplied from the boost unit 20. Therefore, the electric motor 2 can be stably driven by supplying power not from the battery 3 whose voltage is likely to fluctuate but from the boost unit 20 whose voltage is stable.

(2) In addition, the first switching unit 60 includes a first relay 61 provided between the battery 3 and the motor drive unit 7, and a first transistor 64 that is connected to the other end **63*b* of the coil 63 of the first relay 61 and turns on the first relay 61 in response to the control signal from the control unit 8. The second switching unit 70 includes a Zener diode 73 that has a cathode 73*a* connected to an output line 27 of the boost unit 20 and is brought into a conductive state when a voltage output from the boost unit 20 becomes equal to or higher than the predetermined boost voltage Vb, and a second transistor 75 that has a base 75*c* connected to the anode 73*b* of the Zener diode 73 and is turned on when the Zener diode 73 becomes conductive. A collector 75*a* of the second transistor 75 is connected to a base 64*c* of the first transistor 64, and when the second transistor 75 is turned on, the first transistor 64** is turned off.

As a result, the power of the backup power supply 6 can be supplied to the motor drive unit 7 only with a simple circuit configuration, and there is no need to perform complicated control processing.

(3) A second voltage stabilizing unit 76 that stabilizes a voltage output from the boost unit 20 is further provided between the output line 27 of the boost unit 20 and the cathode **73*a* of the Zener diode 73. The second voltage stabilizing unit 76 includes a diode 71 having an anode 71*a* connected to the output line 27 of the boost unit 20 and a cathode 71*b* connected to the cathode 73*a* of the Zener diode 73, and a capacitor 72 having one end 72*a* connected to the cathode 71*b* of the diode 71 and another end 72*b*** grounded.

As a result, by providing the second voltage stabilizing unit 76 that stabilizes the voltage output from the boost unit 20, the stabilized voltage is input to the Zener diode 73, so that the second transistor 75 can be accurately turned on/off.

(4) The predetermined boost voltage Vb is lower than the rated voltage of the battery 3. As a result, it is not necessary to make the boost by means of the boost unit 20 higher than the rated voltage of the battery 3, so that the power consumption can be reduced.

Second Embodiment

Figure 2:
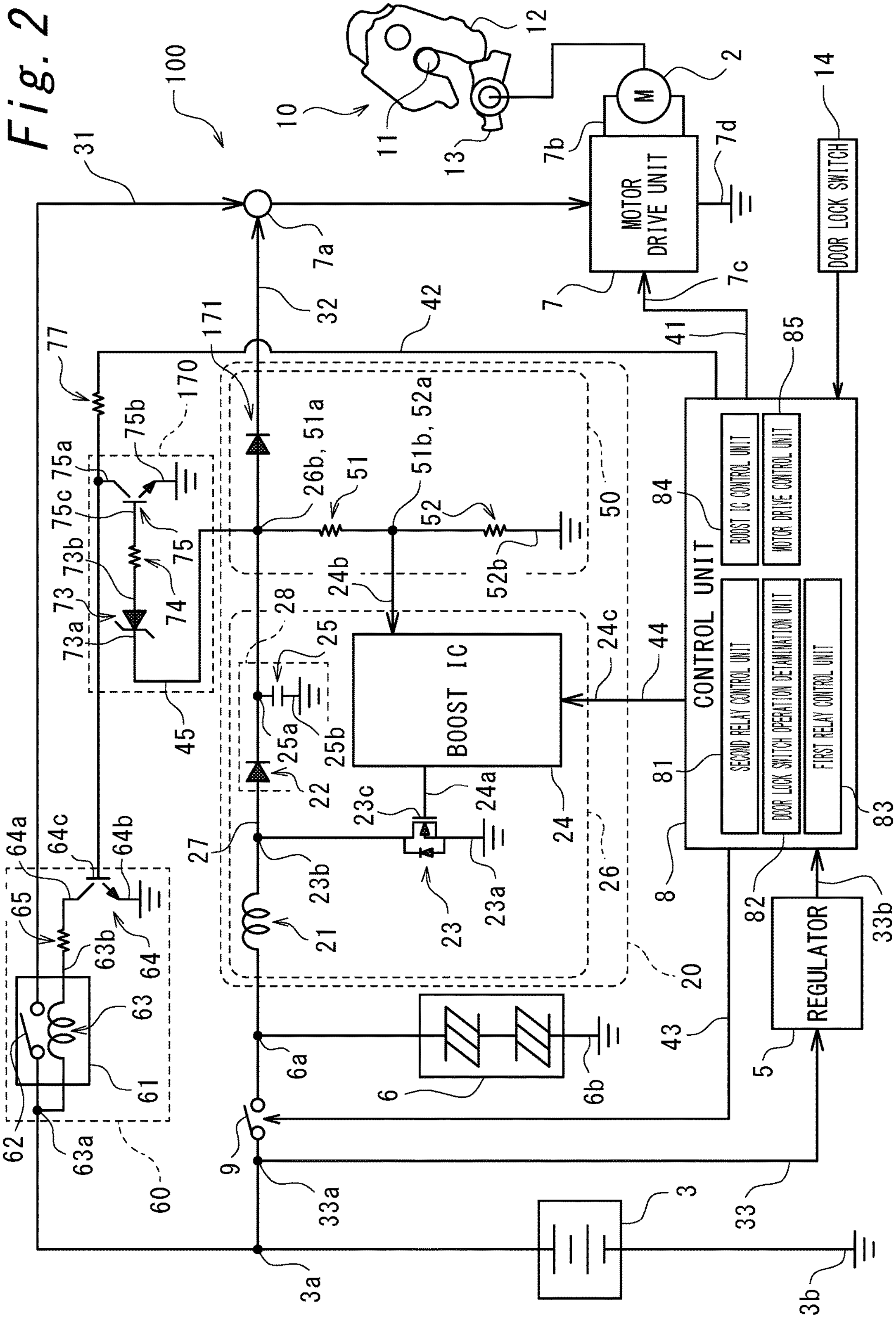
FIG. 2 is a circuit diagram of a vehicle power supply device according to a second embodiment of the present invention.

FIG. 2 is a circuit diagram of a vehicle power supply device 100 according to a second embodiment. The vehicle power supply device 100 according to the second embodiment is different from the vehicle power supply device 1 according to the first embodiment in a configuration of a second switching unit 170. In the following description, the same elements as those of the vehicle power supply device 1 according to the first embodiment are denoted by the same reference numerals, and the description thereof will be omitted.

The second switching unit 170 is different in that it does not include the second voltage stabilizing unit 76, and the cathode 73*a* of the Zener diode 73 is connected to the output terminal 26*b* of the boost circuit 26 in the output line 27. That is, power with suppressed voltage fluctuation is supplied to the Zener diode 73 via the first voltage stabilizing unit 28 provided in the output line 27.

Further, on the second power supply line 32, a diode 171 is provided closer to the motor drive unit 7 than the output terminal 26*b* of the boost circuit 26. The diode 171 causes electricity to flow from the boost circuit 26 toward the motor drive unit 7, and blocks the flow of electricity in the opposite direction. Accordingly, even when the battery 3 and the motor drive unit 7 are electrically connected via the first power supply line 31 and the voltage of the first power supply line 31 is higher than the voltage of the second power supply line 32, the diode 171 prevents the current from flowing from the input terminal 7*a* of the motor drive unit 7 to the second switching unit 170 via the second power supply line 32.

According to the present embodiment, with respect to the vehicle power supply device 1 according to the first embodiment, the second voltage stabilizing unit 76 can be omitted and the vehicle power supply device can be configured by one first voltage stabilizing unit 28.

Note that the vehicle power supply device according to the present invention is not limited to the configuration of the above embodiment, and various modifications can be made.

In the above embodiment, the vehicle power supply device that controls the power supply to the door latch device has been described as an example, but it is not limited thereto. The vehicle power supply device can be applied to an vehicle-mounted device that operates by being supplied with power, for example, an vehicle-mounted device including an electric motor, and can also be used for supplying power to an electric motor, an electromagnetic valve, and the like used for, for example, a power window, an electric tailgate, an electric fuel lid cap, an electric slide door, and the like.

The invention claimed is:

1. A vehicle power supply device comprising:

a backup power supply to which power is supplied from a battery mounted in a vehicle;

a boost unit that boosts a voltage of the backup power supply to a predetermined boost voltage;

a motor drive unit that is connected to the battery and the boost unit and is capable of driving an electric motor by being supplied with power from one of the battery and the boost unit;

a first switching unit that conducts or interrupts power supply between the battery and the motor drive unit;

a control unit that controls the first switching unit; and a second switching unit that is provided between the boost unit and the first switching unit, turns off the first switching unit when the backup power supply is sufficiently charged so that a voltage output from the boost unit becomes equal to or higher than the predetermined boost voltage, and turns on the first switching unit when a charge amount of the backup power supply is not enough such that a voltage output from the boost unit is not boosted to the predetermined boost voltage.

2. The vehicle power supply device according to claim 1, wherein the first switching unit includes a first switching element provided between the battery and the motor drive unit, and a second switching element that is connected to a control terminal of the first switching element and turns on the first switching element in response to the control signal from the control unit, and the second switching unit includes a Zener diode that has a cathode connected to an output line of the boost unit and is brought into a conductive state when a voltage output from the boost unit becomes equal to or higher than the predetermined boost voltage, and a third switching element that has a control terminal connected to an anode of the Zener diode and is turned on when the Zener diode is brought into a conductive state, and the third switching element is connected to a control terminal of the second switching element, and the second switching element is configured to turn off when the third switching element is turned on.

3. The vehicle power supply device according to claim 2, further comprising a voltage stabilizing unit between the output line of the boost unit and the cathode of the Zener diode, the voltage stabilizing unit stabilizing a voltage output from the boost unit, wherein the voltage stabilizing unit includes a diode having an anode connected to the output line of the boost unit and a cathode connected to the cathode of the Zener diode, and a capacitor having one end connected to the cathode of the diode and another end grounded.

4. The vehicle power supply device according to claim 1, wherein the predetermined boost voltage is lower than a rated voltage of the battery.

5. A door latch device comprising:

the vehicle power supply device according to claim 1;

a fork rotatable between a latch position where the fork is in engagement with a striker on a vehicle-body-side and an open position where the engagement is released; and a claw rotatable between a locking position at which holding of the fork at the latch position is performed and a locking release position at which the holding is released, wherein the claw is rotationally driven by an electric motor supplied with power by the vehicle power supply device.

* * * * *